Patented Aug. 18, 1931

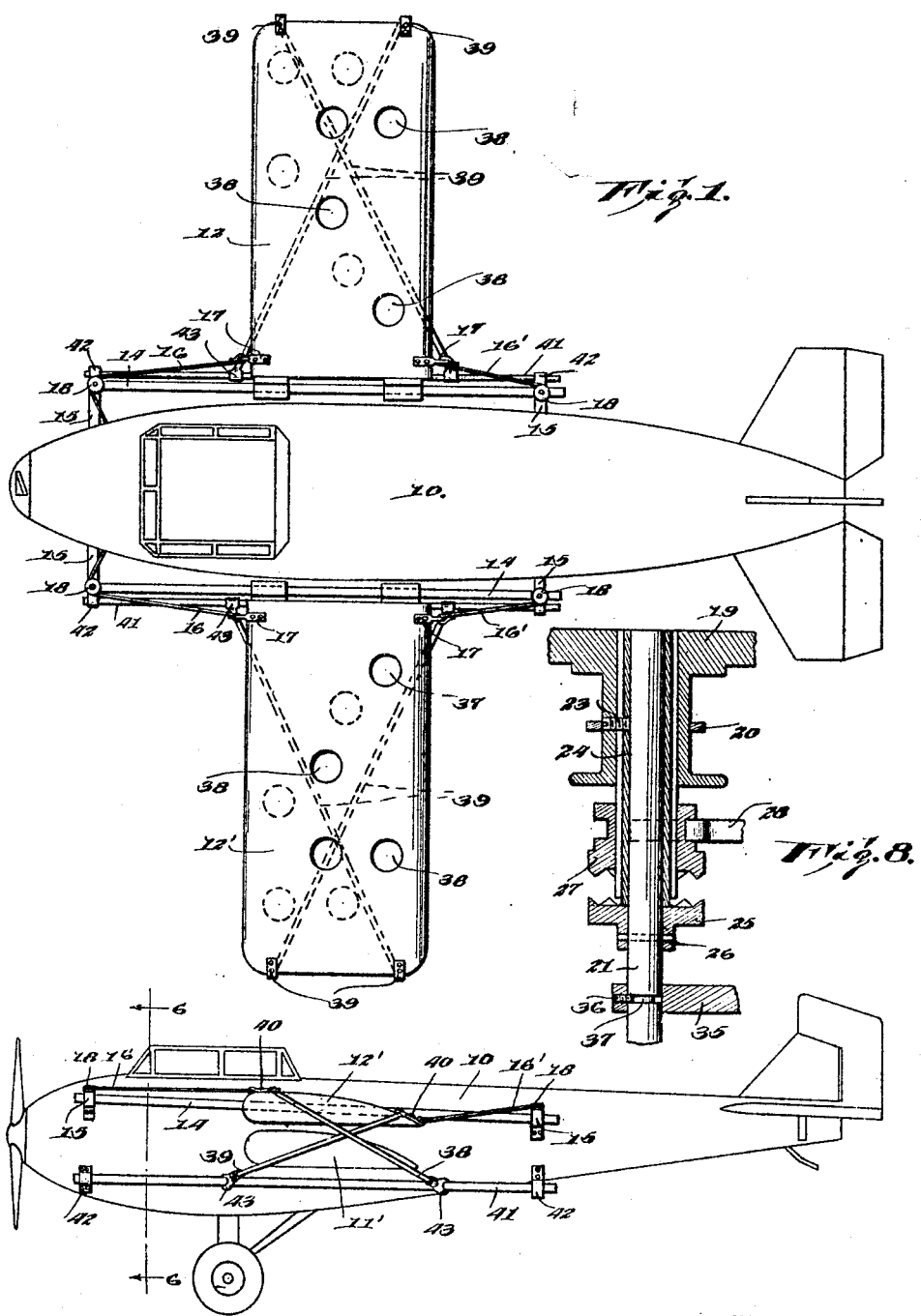

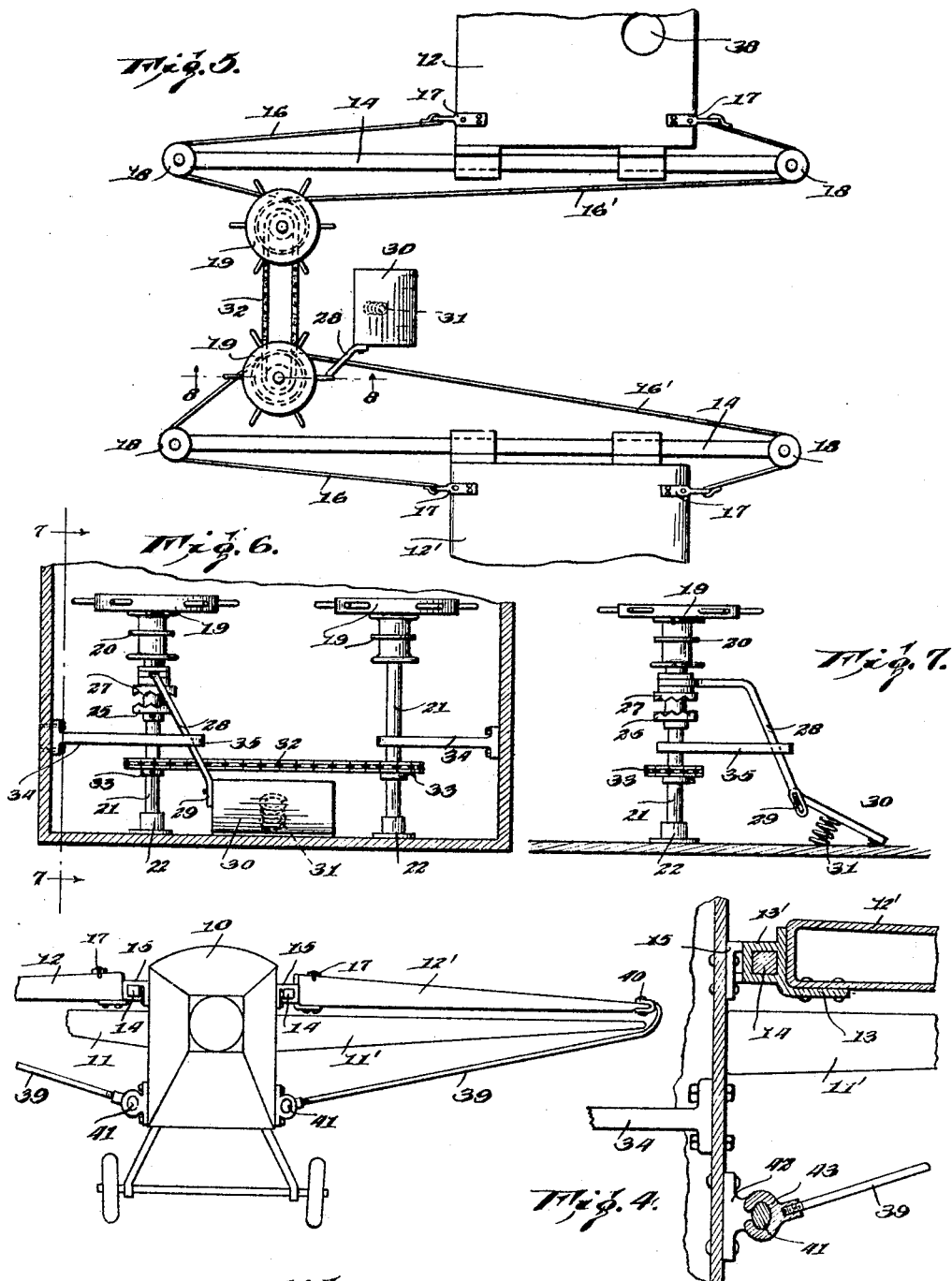

1,819,948

UNITED STATES PATENT OFFICE

FEDERICO G. DIAGO, OF HABANA, CUBA

AIRPLANE

Application filed February 21, 1930. Serial No. 430,329.

This invention appertains to improvements in airplanes generally, and has for an object to provide a slow speed type thereof with means for stabilizing the buoyance of the same correspondingly with variations in speed and to maintain its buoyancy and equilibrium under accidental or intentional failure of the propelling means.

Another object of the invention resides in the provision of a means, directly under the control of a pilot of an airplane, for changing the center of gravity of the airplane in accordance with variations in the speed thereof to maintain the equilibrium and stability of the same in order that it may be safely grounded upon failure of the propulsion means for any cause whatsoever.

A further object of the invention lies in the provision of means for varying the effective lifting and sustaining area of the supporting surfaces or wings of an airplane in order to permit of the forced grounding of the airplane in a substantially vertical direction in the absence of power and without any tendency of the airplane to swag or oscillate during its descending movement.

Another object of the invention is to provide an airplane whose supporting surfaces, or certain of which, are movable at the will of the pilot in a horizontal fore and aft direction to maintain an equilibrium and stability and incidently the center of gravity of the airplane under any and all adverse conditions of operation.

With the foregoing and other equally important objects and advantages in view, the invention resides in the certain new and useful construction, combination and arrangement of parts as will be hereinafter more fully described, set forth in the appended claims and illustrated in the accompanying drawings, in which:

Figure 1 is a top plan view of a practical embodiment of the invention;

Figure 2 is a side elevation thereof;

Figure 3 is a fragmentary front elevation of the improved airplane;

Figure 4 is an enlarged fragmentary vertical section, taken on the line 4—4 of Figure 3;

Figure 5 is a fragmentary plan view of the opposed end portions of the companion movable wing sections, showing the common control means therefor;

Figure 6 is an enlarged fragmentary vertical transverse section, taken on the line 6—6 of Figure 2;

Figure 7 is a fragmentary vertical longitudinal section, taken on the line 7—7 of Figure 6; and Figure 8 is an enlarged vertical section, taken on the line 8—8 of Figure 5.

Referring to the drawings, wherein like characters of reference designate corresponding parts throughout the several views thereof, the embodiment of the invention, as shown therein by way of example only, is constituted in a fuselage 10 having a lower stationary supporting surface or wing, consisting of the sections 11 and 11', fitted to the same preferably in the plane of the normal center of gravity of the airplane, and an upper wing consisting of the sections 12 and 12' mounted thereon for horizontal forward movements relatively to the lower stationary wing sections aforesaid and with which they are normally alined.

Each of the movable wing surfaces or sections 12 and 12' is provided at its attached end with a pair of angled brackets 13 (Figure 4), of substantially L-form, which are secured in place by means of rivets or the like and preferably with the horizontal arms thereof engaged beneath the lower side of the wing end and the vertical arms in abutting relation against the end wall thereof.

Projecting from the outer face of the vertical arm portion of each of the brackets 13 is a supporting lug 13' having a squared aperture extending horizontally through the same; the apertures of companion lugs 13' being alined one with the other in order to be slidably engaged on a guide rail 14 supported at its opposite ends from brackets 15 projecting sidewise from the adjacent side of the fuselage 10. These guide rails 14 are extended horizontally in spaced relation to the opposite sides of the fuselage 10, one for each wing surface or section 12 and 12' and will preferably be of a length to have their opposite ends projected beyond the leading and trailing edges of the stationary wing sections 11 and 11' so that the movable wing sections 12 and 12' may be adjusted forwardly along the same to different positions relative to the stationary wing surfaces or sections.

In the present instance and as shown, the limit of the forward movement of adjustment of the movable wing surfaces or sections 12 and 12' is at a point where the trailing edges thereof will be disposed in slightly overlapping relation with respect to the leading edges of the stationary wing surfaces or sections 11 and 11', the two sets of wing surfaces or sections, of course, being disposed in absolute vertical alinement in the rearwardly disposed position of adjustment of the movable wing sections on the guide rails 14.

To effect the adjustment of the wing sections 12 and 12', one independently of the other, as may be sometime desirable, each of these wing sections will be provided with an operating means, such as the cable sections 16, 16' which will each have one of its opposite ends attached by clips or the like 17 to the leading and trailing edge portions thereof at points thereon in alinement transversely of the same and immediately adjacent the supported end thereof. An intermediate portion of each cable section 16, 16' will be trained about a pulley 18, journaled in a bracket 15 at the opposite end of the guide rail 14, while the opposite ends thereof will be attached to the hub portion of a hand wheel 19 one to each side of an annular flange 20 (Figure 8), arranged centrally of the hub. By this arrangement, one of the attached end portions of the cable sections 16, 16' will wind about the hub while the other unwinds therefrom whenever the hand wheels 19 are rotated in either direction. In this instance, the hand wheels 19 will be keyed in a suitable manner, one to the upper end of each of a pair of vertically disposed shafts 21, which are journaled at their lower ends in suitable bearings 22 mounted on the floor of the fuselage in transverse alined relation. The hand wheels 19 and shafts 21 will be suitably arranged in place within the pilot's cabin or cock-pit of the fuselage 10, in easy reach of the pilot from his position at the usual controls of the airplane, with the cable sections 16, 16', of each of the movable wing surfaces or sections 12 and 12' passing from the hubs outwardly through openings formed in the side walls of the fuselage in line with the pulleys 18 and from thence to their points of attachment 17 with the movable wing surfaces or sections.

However, it may happen that in order to properly stabilize the airplane under certain conditions, the adjustment of the movable wing sections 12 and 12' may be effected simultaneously and to such end, one of the hand wheels 19 is preferably keyed, as at 23 (Figure 8), to a sleeve 24 engaged over the upper end of one of the vertical shafts 21 above a clutch member 25 which, in turn, is fixedly secured to the shaft by a key or the like 26. A second clutch member 27 is splined on the sleeve 24 for vertical sliding movements thereon and is to be actuated into and out of engagement with the fixed clutch member 25 by means of an arm 28 extending angularly downward to a point of connection 29 with a foot pedal or the like 30.

This actuating member or foot pedal 30 is normally sustained in its inoperative position by means of a coil spring or the like 31 which will be placed under compression or tension whenever the member or pedal is depressed for the purpose of actuating the movable clutch member 27 into engagement with the fixed clutch member 25, and in order that its rebound or expansion effect, when the member or pedal is released, will return the latter and the movable clutch member 27 to their inoperative position. With the movable clutch member 27 engaged with the fixed clutch member 25, the simultaneous rotation of the shafts 21 and the sleeve 24, when either or both of the hand wheels 19 are manipulated is had through the medium of a chain 32 connecting sprockets 33, one of the latter being keyed to each of the shafts 21.

As shown in Figures 5 to 8 inclusive, each shaft 21 is braced by a bracket or the like 34 and extending between the same and the adjacent side wall of the fuselage 10. The bracket 34, associated with the shaft 21 on which the clutch members 25 and 27 are mounted, is however provided with an angular extension 35 which is longitudinally slotted toward its free end for engagement with the actuating arm 28, of the movable clutch member 27, and for which it acts as a guide. In order to permit of the free rotation of the shaft 21 associated with the bracket having the extension 35, the apertured portion of the bracket, engaged about the shaft, is provided with a set screw or the like 36 which engages in an annular groove 37 formed on the shaft, substantially as is shown in Figure 8 only.

With the return of the platform or foot pedal 30 to normal position, after the hand wheels 19 have been manipulated to actuate the movable wing surfaces or sections 12 and 12' to forwardly offset relation with respect to the stationary wing sections or surfaces 11 and 11', the former will, of course, be likewise returned to their normal positions rearwardly on the guide rails 14 by reason of the winding and unwinding action of the cable sections 16, 16' on the hub portions of the hand wheels 19. The several supporting surfaces or wing sections 11, 11' and 12, 12', are each provided with a series of apertures 13 or vents 38 passing vertically through the same and they are so arranged that those of the movable surfaces or sections 12 and 12' will not coincide or register with those of the stationary wing surfaces or sections 11 and 11' when the former are disposed in alined relation with respect to the latter. With the movable wing sections or surfaces 12 and 12' adjusted to full forward offset positions relative to the stationary wing surfaces or sections 11 and 11', the several apertures or vents 38 of all wing sections will be open to allow for the passage upwardly therethrough of streams of air which will act to stabilize the airplane as it descends, thus avoiding the usual swagging or oscillation of the airplane incident to dropping descent as in nose dives or tail spinning and otherwise permitting the pilot to keep the airplane in control and to bring it down almost vertically with the power off, as in the case of motor trouble or broken or lost propeller.

As shown in Figures 1 to 4, inclusive, each of the movable surfaces or sections 12 and 12' is to be effectively braced from its outer end by means of a pair of crossed braces 39 which are disposed beneath the companion wing sections 11 and 11' and have their outer ends curved upwardly about and over the outer ends of the latter for attachment, as at 40, in a suitable manner to the outer end edge portion of the wing sections 12 and 12'. These braces 39 are declined inwardly from their outer ends and have their inner ends shaped for sliding engagement with a guide rail 41 secured at its opposite ends in brackets 42 projecting from the adjacent side of the fuselage 10 which guide rail 41 is disposed in spaced parallel relation to the adjacent one of the guide rails 14 of the movable wing sections or surfaces 12 and 12' and below the same. The end of each of the brace members 39, engaged with the guide rails 41, is preferably of forked formation, as at 43, to fit about the companion guide rail without any binding effect therebetween. To this latter end and as shown in Figure 4, each of the guide rails 41 is preferably oval shaped in vertical cross section, which, as a consequence thereof will also act to prevent any turning movement of the braces 39 thereof. These forked end portions 43 may be separate from the brace rods 39 and provided with screw threaded sockets for attachment thereto, substantially as is shown in Figure 4.

In the operation of the airplane, as thus constructed and arranged, and with the movable wing sections 12 and 12' normally disposed, i. e., rearwardly on the guide rails 14 and in alinement with respect to the stationary wing sections 11 and 11', take off flight and landing will be accomplished in the usual manner. However, a landing can be made safely at a much slower speed than is ordinarily required if the pilot so desires, in which case, as the propeller speed is reduced the pilot will operate the actuating member or foot pedal to connect the clutch members 27 and 25 together and thereafter slide the movable wing sections or surfaces 12 and 12' forwardly along the guide rails 14, keeping them at relative positions thereon where the stability and equilibrium of the airplane will be maintained correspondingly with the amount of speed reduction. As before stated, this movement of the wing sections will be accomplished by a proper manipulation of the hand wheels 19 which will rotate simultaneously, when the clutch members 27 and 25 are engaged, through the medium of the chain and sprocket mechanism 32 and 33. This forward adjustment or movement of the wing surfaces or sections 12 and 12' incidentally advances the center of gravity of the airplane and thereby sustains it on even keel by maintaining its equilibrium and balance, while it also causes certain of the openings in all of the several wing surfaces or sections to be uncovered for the discharge of air streams upwardly therethrough to further stabilize the craft in its continued flight and prevent tendencies toward nose dives or tail spins.

Again, if a vertical or nearly vertical descent and landing is desired, or made necessary by motor or propeller trouble, upon the intended or accidental failure of the propulsion means, the pilot will operate the hand wheels 19 in a manner to bring the movable surfaces or sections 12 and 12' to a full forward position in advance of the stationary wing surfaces or sections 11 and 11' when maximum supporting effect by the down action of the several wing sections will be available and the bouyancy and equilibrium of the airplane maintained. so that the airplane may be grounded gently and in safety. In this position, the openings will be fully uncovered in all of the several wing sections and the air streams passing upwardly thereof will increase in effectiveness against tendency toward unbalancing otherwise resulting in crashes from nose dives or tail spins.

In banking an airplane the movement of the same may be faciliated by the pilot adjusting only one of the movable wing sections toward fore position through the medium of its independent control, i. e., when the clutch members 25 and 27 are disengaged, the wing section so employed being the one at the outer side of the path of movement of the airplane. Here, the balance of the airplane will be changed or varied by the movable wing section employed at the moment to meet the different air conditions from that obtained in the straight-away flight thereof. Upon the completion of the banking movement, the forwardly adjusted wing section will be returned to normal position as the airplane proceeds on its newly taken straight away course.

Without further description, it is thought that the features and advantages of the invention will be readily apparent to those skilled in the art and it will of course be understood that changes in the form, proportion and minor details of construction may be resorted to, without departing from the spirit of the invention or its scope as claimed.

I claim:

1. An airplane having stationary wing members and other wing members independently shiftable horizontally to and from normally alined relation with respect to the stationary wing members, each of said wing members having vertically disposed apertures therein which are substantially closed to the passage of air therethrough when the shiftable wing members are alined with the stationary wing members, said apertures being staggered whereby to be progressively opened and closed during movements of the shiftable wing members relatively to the latter.

2. The combination with an airplane fuselage, of stationary wing sections mounted on opposite sides of the fuselage in a plane of the normal center of gravity thereof, and other wing sections mounted for horizontal sliding movements at the opposite sides of the fuselage, said other wing sections being mounted above the stationary wing sections and normally alined therewith and adapted to be shifted in a forward direction relative to the stationary wing sections correspondingly with a shifting of the center of gravity of the airplane incident to its travel at slow speeds or upon intended or accidental failure of its propulsion means in order to maintain the equilibrium of the same at all times.

3. The combination with an airplane fuselage, of stationary wing sections mounted on opposite sides of the fuselage in a plane of the normal center of gravity thereof, and other wing sections mounted for horizontal sliding movements at the opposite sides of the fuselage, said other wing sections being mounted immediately above the stationary wing sections and normally alined therewith and adapted to be shifted in a forward direction relative to the stationary wing sections correspondingly with a shifting of the center of gravity of the airplane incident to its travel at slow speeds or upon intended or accidental failure of its propulsion means in order to maintain the equilibrium of the same at all times.

4. The combination with an airplane fuselage, of stationary wing sections mounted on opposite sides of the fuselage in a plane of the normal center of gravity thereof, and other wing sections mounted for horizontal sliding movements at the opposite sides of the fuselage, said other wing sections being mounted above the stationary wing sections and normally alined therewith and adapted to be shifted in a forward direction relative to the stationary wing sections correspondingly with a shifting of the center of gravity of the airplane incident to its travel at slow speeds or upon intended or accidental failure of its propulsion means in order to maintain the equilibrium of the same at all times, all of the several wing sections having vertically disposed apertures therein which are substantially closed when the movable wing sections are alined with the stationary wing sections.

5. The combination with an airplane fuselage, of stationary wing sections mounted on opposite sides of the fuselage in a plane of the normal center of gravity thereof, other wing sections mounted for horizontal sliding movements at the opposite sides of the fuselage, said other wing sections being mounted above the stationary wing sections and normally aligned therewith and adapted to be shifted in a forward direction relative to the stationary wing sections correspondingly with a shifting of the center of gravity of the airplane incident to its travel at slow speeds or upon intended or accidental failure of its propulsion means in order to maintain the equilibrium of the same at all times, all of the several wing sections having vertically disposed apertures therein which are substantially closed when the movable wing sections are alined with the stationary wing sections, and means for bracing the movable wing sections.

6. The combination with an airplane fuselage, of stationary wing sections mounted on opposite sides of the fuselage in a plane of the normal center of gravity thereof, other wing sections mounted for horizontal sliding movements at the opposite sides of the fuselage, said other wing sections being mounted above the stationary wing sections and normally alined therewith and adapted to be shifted in a forward direction relative to the stationary wing sections correspondingly with a shifting of the center of gravity of the airplane incident to its travel at slow speeds or upon intended or accidental failure of its propulsion means in order to maintain the equilibrium of the same at all times, all of the several wing sections having vertically disposed apertures therein which are substantially closed when the movable wing sections are alined with the stationary wing sections, and means mounted on the fuselage for actuating the movable wing sections.

7. The combination with an airplane fuselage, of stationary wing sections mounted on opposite sides of the fuselage in a plane of the normal center gravity thereof, other wing sections mounted for horizontal sliding movements at the opposite sides of the fuselage, said other wing sections being mounted above the stationary wing sections and normally alined therewith and adapted to be shifted in a forward direction relative to the stationary wing sections correspondingly with a shifting of the center of gravity of the airplane incident to its travel at slow speeds or upon intended or accidental failure of its propulsion means in order to maintain the equilibrium of the same at all times, all of the several wing sections having vertically disposed apertures therein which are substantially closed when the movable wing sections are alined with the stationary wing sections, and means mounted on the fuselage for actuating the movable wing sections one independently of the other.

8. The combination with an airplane fuselage, of stationary wing sections mounted on opposite sides of the fuselage in a plane of the normal center of gravity thereof, other wing sections mounted for horizontal sliding movements at the opposite sides of the fuselage, said other wing sections being mounted above the stationary wing sections and normally alined therewith and adapted to be shifted in a forward direction relative to the stationary wing sections correspondingly with a shifting of the center of gravity of the airplane incident to its travel at slow speeds or upon intended or accidental failure of its propulsion means in order to maintain the equilibrium of the same at all times, all of the several wing sections having vertically disposed apertures therein which are substantially closed when the movable wing sections are alined with the stationary wing sections, and means mounted on the fuselage for selectively actuating the movable wing sections either simultaneously or one independently of the other.

FEDERICO G. DIAGO.